US005561527A

United States Patent [19]

Krone-Schmidt et al.

[11] Patent Number: 5,561,527

[45] Date of Patent: Oct. 1, 1996

[54] OPTICAL SENSING APPARATUS FOR $CO_2$ JET SPRAY DEVICES

[75] Inventors: Wilfried Krone-Schmidt, Fullerton; Michael J. Slattery, Gardena; Werner V. Brandt, Redondo Beach, all of Calif.

[73] Assignee: Hughes Aircraft Company, Los Angeles, Calif.

[21] Appl. No.: 403,039

[22] Filed: Mar. 13, 1995

[51] Int. Cl.[6] .......................... G01N 21/59; B24B 49/12

[52] U.S. Cl. .......................... 356/414; 356/436; 356/437; 451/6; 451/39

[58] Field of Search .......................... 356/436, 437, 356/409, 414; 451/6, 39

[56] References Cited

U.S. PATENT DOCUMENTS 4,541,272 9/1985 Bause .......................... 356/414 X
4,873,855 10/1989 Thompson .......................... 451/39 X
5,405,283 4/1995 Goenka .......................... 451/39

*Primary Examiner*—Vincent P. McGraw
*Attorney, Agent, or Firm*—M. E. Lachman; M. W. Sales; W. K. Denson-Low

[57] ABSTRACT

Optical sensing apparatus for use with a $CO_2$ jet spray nozzle that sprays a plume. The apparatus comprises a coherent light source that provides a light beam. A photodiode is disposed such that it detects the light beam emitted by the coherent light source that passes through the plume sprayed by the $CO_2$ jet spray nozzle. A bandpass filter is disposed between the photodiode and the coherent light source that only passes light produced by the coherent light source. A controller coupled to the coherent light source and the photodiode that comprises a power supply for providing power to the coherent light source and the photodiode. The controller includes a digital voltmeter coupled to the photodiode for displaying a voltage output signal corresponding to the amount of light energy detected by the photodiode, and a go/no-go indicator for providing an indication of $CO_2$ snow production.

8 Claims, 1 Drawing Sheet

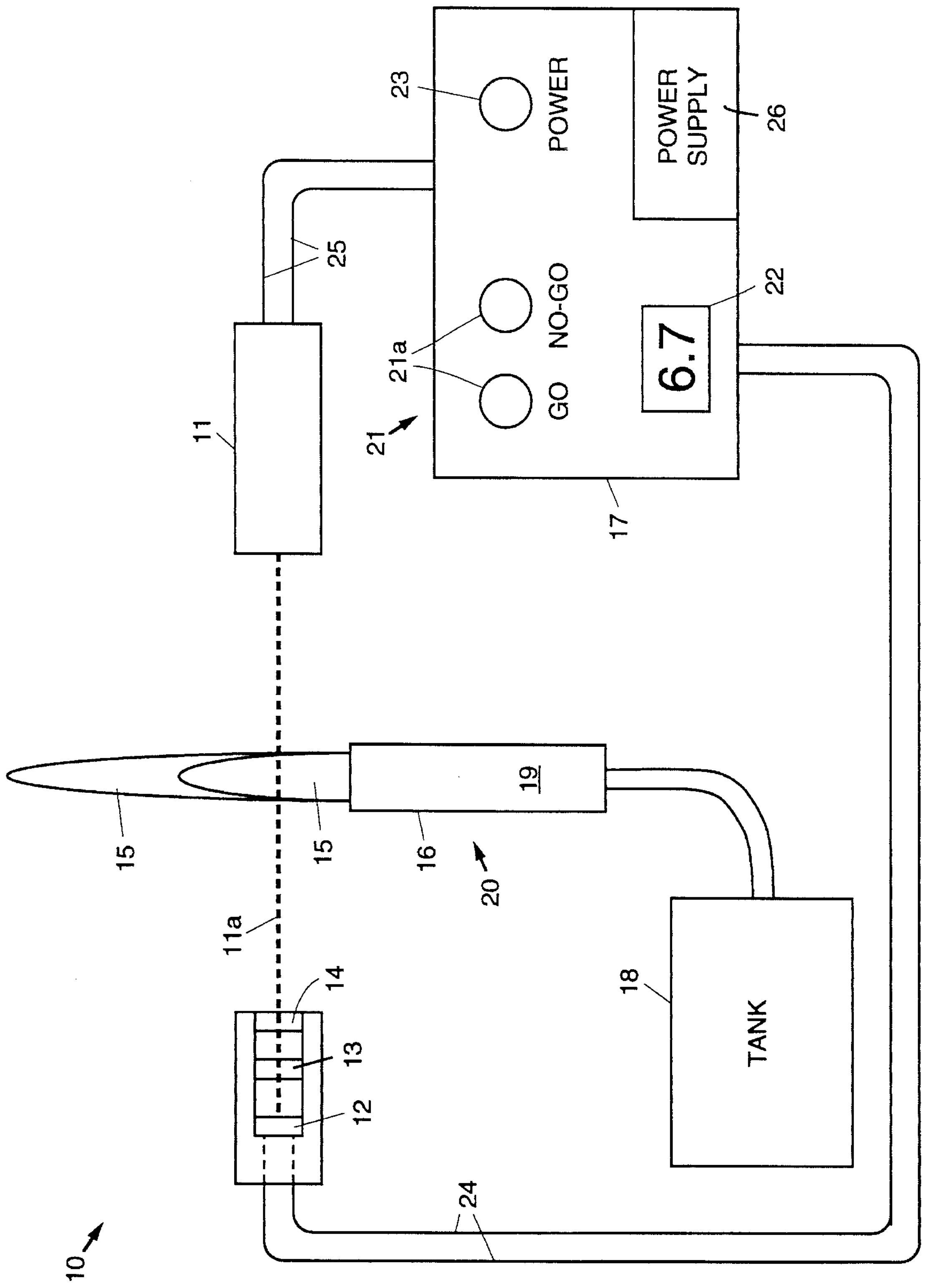
POWER
POWER SUPPLY
GO
NO-GO
6.7
TANK
10
11
11a
12
13
14
15
15
16
17
18
19
20
21
21a
22
23
24
25
26

OPTICAL SENSING APPARATUS FOR $CO_2$ JET SPRAY DEVICES

BACKGROUND OF THE INVENTION

1. Field of the Invention

The present invention relates to $CO_2$ jet spray systems, and more particularly, to an optical sensor for use with $CO_2$ jet spray nozzles employed in a $CO_2$ jet spray system.

2. Description of Related Art

One means for detecting $CO_2$ snow in jet sprays which has been used by the assignee of the present applcation comprises a thermocouple $CO_2$ snow sensor. The disadvantages of the thermocouple sensor are its slow response time, which resulted in wasted cleaning time and wasted gas, its expensive instrumentation, and the fact that it only provided indirect detection of the $CO_2$ snow plume. In addition, the thermocouple $CO_2$ snow sensor cannot be immersed in the $CO_2$ cleaning plume, since it disturbs the spray characteristic of the plume.

A particle counter has heretofore been used to detect $CO_2$ snow in jet spray systems built by the assignee of the present invention. However, the error margin using these devices is relatively great, the measurements are indirect, the equipment is expensive, and it is difficult to interface the counter to a robotic controller.

Aside from the above-discussed devices, there are no other $CO_2$ snow sensors that are commercially available. A variety of light-based particle counting devices exist which might be adapted for use in a limited sense to detect solid $CO_2$ snow. These devices include particle scatter detectors, Doppler anemometers, zone sensors, and obscuration-type sensors.

Scatter-type sensors are excellent for measuring airborne particles in a gas stream, or clean room environment, but have difficulty handling harsh temperature extremes induced by the $CO_2$ cooling effect. In addition, scatter-type sensors frequently misdiagnose ice pellets resulting from the cooled $CO_2$ particles. Doppler anemometers may be used to give simultaneous size and velocity measurements of particles (including $CO_2$ particles) in a gas stream, but for the vast majority of applications, they are extremely price prohibitive. Zone sensing has two disadvantages relating to $CO_2$ particle counting. First, zone sensing is not a real time procedure, and second, it is cost prohibitive. Detection of particles using beam obscuration is conducted in several off-the-shelf particle counters. These counters are relatively expensive, and suffer the same pitfalls as light scattering detectors concerning $CO_2$ cooling and ice particle counting.

A trained operator can distinguish between snow that has good cleaning ability. However, in an automated system, operator interaction should be eliminated because it is slightly subjective, and gives rise to significant errors. Various checks and safety devices are typically built into conventional robotic $CO_2$ snow systems. However, a conventional robotic system may perform a complete cleaning cycle without any $CO_2$ gas escaping from the nozzles. This condition is not easily detected in conventional systems. After opening of the jet spray valve, there is always some lead time before productive snow emerges. Waiting a set amount of time before start of the cleaning cycle is inefficient in time and $CO_2$ management. At a point when liquid $CO_2$ becomes depleted, sufficient cleaning snow is no longer produced. However, high pressure gas still sprays out of the nozzle and gives the appearance of snow. Detecting this condition can be difficult for even a trained operator.

Therefore, it is an objective of the present invention to provide for an optical sensor for use with $CO_2$ jet spray nozzles employed in $CO_2$ jet spray systems.

SUMMARY OF THE INVENTION

In order to meet the above and other objectives, the present invention provides for an optical $CO_2$ snow sensor that comprises a light source (a laser diode or a HeNe laser), a detector (optimized for the laser diode or laser), a power supply to power the diode and the detector, and a controller comprising a voltage reading electronic circuit to differentiate between at least two voltages and go/no-go indicators. The optical $CO_2$ snow sensor is used to determine if productive $CO_2$ snow is produced by a $CO_2$ jet spray nozzle and whether or not it is capable of cleaning. This determination is made without physical interference with the actual $CO_2$ jet spray plume, and it is accomplished in real time. Any disturbance of the gas flow is immediately detectable and this indicator may be used to shut down the operation of the system, or provide a signal to an operator that something requires attention. This type of feedback is not currently available in conventional $CO_2$ jet spray systems.

The present invention may be used to provide real-time feedback to a robotic system when cleaning can take place due to the presence of productive $CO_2$ snow. As more and more automatic jet spray systems are considered for high volume operation, it is imperative that a a "go" "no-go" $CO_2$ snow sensor be included in the system. The advantage of the present optical $CO_2$ snow sensor is that it provides immediate feedback regarding the condition of the actual $CO_2$ jet spray plume used for cleaning. The optical $CO_2$ snow sensor may be used in a stationary mode where the condition of the plume is read at the beginning and at the end of a cleaning cycle. The optical $CO_2$ snow sensor may also be used in a mobile configuration where it is attached to the nozzle and provides real-time feedback as to the condition of the plume during the cleaning cycle.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which the sole drawing FIGURE illustrates an optical sensor system in accordance with the principles of the present invention for use with a $CO_2$ jet spray device.

DESCRIPTION OF THE PREFERRED EMBODIMENTS

Referring to the drawing FIGURE, it illustrates an optical sensor 10, or sensor apparatus 10, in accordance with the principles of the present invention for use with a $CO_2$ jet spray device 20 that may be used as part of a manual or automatic jet spray cleaning system. The optical sensor 10 comprises a laser $CO_2$ snow/gas monitor for use in sensing plumes 15 comprising $CO_2$ gas and/or $CO_2$ snow produced by a $CO_2$ jet spray nozzle 16 that is part of the $CO_2$ jet spray device 20.

The $CO_2$ jet spray device 20 comprises a $CO_2$ jet spray nozzle 19 that is coupled to a liquid $CO_2$ tank 18 that supplies liquid from which $CO_2$ snow is produced. $CO_2$ snow is generated and sprayed from an output end of the jet spray nozzle 19 in a conventional manner to clean surfaces and components, and the like.

The optical sensor 10 includes a coherent light source 11, such as a laser diode 11 or a helium neon (HeNe) laser 11, for example, a photodiode 12, a bandpass filter 13 that may be centered at 6328 Angstroms, for example, so that it passes only light produced by the HeNe laser 11 or laser diode 11, for example, and a controller 17 comprising a power supply 26, a digital voltmeter 22 and a go/no-go indicator device 21 comprising indicators 21, and a power on/off indicator 23. The optical sensor 10 monitors the attenuation of a light beam 11*a* produced by the light source 11, such as a HeNe laser beam 11*a* produced by the laser 11 or laser diode 11, that is transmitted through the $CO_2$ plume 15 emitted by the $CO_2$ jet spray nozzle 16 during operation. The photodiode 12 and light source 11 are coupled to the controller 17 by way of electrical wires 24, 25.

The light beam 11*a* emitted by the coherent light source 11 may be attenuated using a neutral density filter 14, such as an ND2 neutral density filter 14, for example, to prevent light (laser) energy from saturating the photodiode 12. One photodiode 12 that may be used in the present optical sensor 10 is a model SDL444 photodiode 12 manufactured by Silicon Detector Corporation, for example. A bandpass filter 13 is disposed over or in front of the photodiode 12 which allows only the 6328 Angstrom wavelength light to be detected, which corresponds to the wavelength of the light beam 11*a* emitted by the HeNe laser 11, for example. The effect of ambient light on the photodetector 12 is thus minimized. The energy (power) of the light beam 11*a* incident on the photodiode 12 is proportional to its output in volts. The responsivity of the photodiode 12 is approximately $1.2\times10^6$ volts/watt. The output signal from the photodetector 12 is read out on the digital voltmeter 22. Two 9 volt batteries or the power supply 26 power a preamplifier circuit (not shown) of the photodetector 12.

The intensity of the light beam 11*a* detected by the photodetector 12 is measured as a function of different types of $CO_2$ snow plumes 15. Three configurations of $CO_2$ snow plumes 15 are measured including: $CO_2$ gas, a $CO_2$ snow and gas mixture, and $CO_2$ snow. As is illustrated in Table 1, the photodetector 12 provides an output of 6.7 volts for $CO_2$ gas, corresponding to no attenuation of the light beam 11*a*, 3.0 volts for the snow and gas mixture, which corresponds to a $CO_2$ tank 18 running out of fluid, and 0.3 volts for a plume 15 of snow representative of normal operating conditions.

TABLE 1

| Jet Spray Condition | Voltage (V) | Throughout |
|---|---|---|
| $CO_2$ gas | 6.7 | 1.00 |
| $CO_2$ gas + $CO_2$ snow | 3.0 | 0.45 |
| $CO_2$ snow | 0.3 | 0.05 |

The fact that a factor of ten exists between the output of the photodetector 12 for the snow and gas condition relative to the snow condition allows the present optical $CO_2$ snow sensor 10 to be used to detect when snow or gas is emitted from the nozzle 16. The particular nozzle 16 used to produce the test results shown in Table 1 was a relatively small diameter nozzle 16. A larger diameter nozzle 16 produces more attenuation, making the optical $CO_2$ snow sensor 10 even more sensitive to the three possible snow and gas conditions.

A trained operator can distinguish between snow that has good cleaning ability and snow that does not. In an automated system, for example, operator interaction should be eliminated or minimized because it is slightly subjective, and gives rise to significant errors. The present optical $CO_2$ snow sensor 10 gives immediate feedback to the operator, and it is light weight. The laser diode 11, for example, and the photodetector 12 are highly compact and may be mounted to the nozzle 16, for example.

Power requirements are minimal. The required circuit may be miniaturized into a single chip and may be integrated as part of a hand-held $CO_2$ jet spray gun, and the go/no-go indicator 21, such as may be provided by red and green lights 21*a* may be used to give immediate confirmation for cleaning to proceed.

The optical $CO_2$ snow sensor 10 will not disturb the $CO_2$ jet spray plume 15. Various checks and safety devices are built into a typical robotic system. A conventional robotic system is capable of performing a complete cleaning cycle without any $CO_2$ gas being emitted from its nozzle 16. This condition is most easily detected by the present optical $CO_2$ snow sensor 10. After opening of a jet spray valve to permit flow from the nozzle 16, there is always some lead time before productive $CO_2$ snow emerges. Waiting a set amount of time before start of the cleaning cycle is inefficient in time and $CO_2$ management. The present optical $CO_2$ snow sensor 10 differentiates between $CO_2$ snow produced at start-up time and productive $CO_2$ snow. At a point when liquid $CO_2$ becomes depleted, sufficient cleaning snow is no longer produced. However, high pressure gas still sprays out of the nozzle 16 and gives the appearance of snow. Detecting this condition can be difficult for even a trained operator, but is readily detected by the present optical $CO_2$ snow sensor 10.

Thus there has been described a new and improved $CO_2$ jet spray system employing an optical sensor for use with $CO_2$ jet spray devices. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. Optical sensing apparatus for determining the extent of $CO_2$ snow production by a $CO_2$ jet spray nozzle that sprays a plume comprising $CO_2$ snow, $CO_2$ gas, or a mixture of $CO_2$ snow and gas wherein said plume is used to clean a substrate, said apparatus comprising:

a coherent light source for providing a light beam;

a photodiode disposed such that it detects the light beam emitted by the coherent light source after the light beam passes through the plume sprayed by the $CO_2$ jet spray nozzle;

a bandpass filter disposed between the photodiode and the coherent light source that only passes light produced by the coherent light source; and a controller coupled to the coherent light source and the photodiode that comprises a power supply for providing power to the coherent light source and the photodiode, a digital voltmeter coupled to the photodiode for displaying a voltage output signal corresponding to the amount of light energy detected by the photodiode wherein said voltage output signal is indicative of the extent of $CO_2$ snow production, and a go/no-go indicator for providing an indication of $CO_2$ snow production suitable for cleaning the substrate.

2. The apparatus of claim 1 wherein the coherent light source is a laser diode.

3. The apparatus of claim 1 wherein the coherent light source is a helium neon laser.

4. The apparatus of claim 1 further comprising a neutral density filter disposed between the coherent light source and the photodiode to prevent light energy from saturating the photodiode.

5. The apparatus of claim 1 wherein the intensity of the light beam detected by the photodetector is measured as a function of different types of $CO_2$ snow plumes.

6. The apparatus of claim 5 wherein the $CO_2$ snow plumes are characterized by $CO_2$ gas, corresponding to no attenuation of the light beam.

7. The apparatus of claim 5 wherein the $CO_2$ snow plumes are characterized by a $CO_2$ snow and gas mixture, corresponding to the tank running out of fluid.

8. The apparatus of claim 5 wherein the $CO_2$ snow plumes are characterized by $CO_2$ snow, corresponding to normal operating conditions.

* * * * *